Patented June 5, 1945

2,377,546

UNITED STATES PATENT OFFICE 2,377,546

PROCESS FOR TREATING HYDROCARBON CONTAINING ORGANICALLY COMBINED FLUORINE

Frederick E. Frey, Bartlesville, Okla., assignor to Phillips Petroleum Company, a corporation of Delaware No Drawing. Application August 30, 1943, Serial No. 500,553

5 Claims. (Cl. 196—44)

The present invention relates to a method of removing organic fluorine from hydrocarbon materials and more particularly from hydrocarbon materials which contain organic fluorine as a result of having been prepared by processes involving use of fluorine-containing catalysts, such as boron trifluoride but more especially hydrogen fluoride.

This application is a continuation-in-part of my prior and copending application Serial No. 398,361 filed June 16, 1941, now Patent No. 2,347,945 issued May 2, 1944.

Hydrogen fluoride is finding use to an increasing extent as a catalyst in hydrocarbon conversions, especially alkylation of paraffins with olefins to make motor and aviation fuel components of high anti-knock rating. It is also being used as a treating and refining agent for motor and aviation fuels and lubricating oil. The crude hydrocarbon products obtained by such processes contain substantial amounts of organically combined fluorine which must be removed in order to meet specifications. Products made with other fluorine-containing catalysts, chief among which is boron trifluoride, likewise contain combined organic fluorine.

Hydrocarbon materials that have been prepared by processes of the foregoing type in which fluorine-containing catalysts are used contain small proportions of organic fluorine in the form of organic compounds which are believed to be predominantly alkyl and/or aryl fluorides. Heretofore this organic fluorine has been removed by passing the hydrocarbon material through a solid porous contact material of the type of activated alumina or bauxite. Unfortunately, however, contact materials of this type may contain up to so much as 20 per cent by weight of silica, which apparently reacts with hydrofluoric acid formed by decomposition of the organic fluorine compounds to form silicon tetrafluoride. This silicon tetrafluoride is highly objectionable because contact of it with moisture liberates hydrofluoric acid which is exceedingly corrosive, and at the same time deposits gelatinous silicic acid which accumulates until the equipment is plugged. Moreover the resultant loss of fluorine in the form of silicon tetrafluoride is economically undesirable.

The principal object of the present invention is to provide for the removal of organic fluorine from hydrocarbon materials containing the same. Another object is to remove organic fluorine from hydrocarbon materials that have been prepared by processes in which fluorine-containing catalysts are used. Another object is to provide a method for the liberation of hydrogen fluoride from hydrocarbon materials containing organic fluorine and fixation of hydrogen fluoride so liberated. Numerous other objects will hereinafter appear.

In accordance with the present invention, the removal of organic fluorine from hydrocarbon materials containing the same is accomplished by treating the hydrocarbon material with alumina impregnated with an alkali metal compound capable of combining with hydrogen fluoride, effecting decomposition of the organic fluorine compounds present in the hydrocarbon with consequent liberation of hydrogen fluoride and combination of the hydrogen fluoride so liberated with the alkali metal compound carried by the alumina. The decomposition of the organic fluorine compounds is effected by the employment of elevated temperatures in the treatment, other conditions being such as to favor this decomposition and combination of the hydrogen fluoride set free with the alkali metal compound. Preferably the temperature lies between 150 and 550° F.

The alumina may be in any form which is sufficiently adsorbent to allow impregnation with the alkali metal compound. Usually and preferably the alumina is in the form of either bauxite or activated alumina. This alumina is impregnated with from approximately 2 to approximately 10% by weight of the alkali metal compound, and any moisture is removed, whereupon the resulting material is then ready for use in carrying out the invention.

As the alkali metal compound I may employ any alkali metal compound which is capable of combining with hydrogen fluoride. The preferred alkali metal compound is the alkali hydroxide. Instead of the hydroxide I may employ any alkali metal salt or compound which is capable of combining with hydrogen fluoride. It is preferred to use an alkali metal compound which combines with the hydrogen fluoride to give the alkali acid fluoride. For example, one mol of the alkali metal hydroxide reacts with two mols of HF to give the alkali metal acid fluoride and one mol of water. One mol of alkali metal fluoride reacts with one mol of FH to give the alkali acid fluoride directly. Accordingly, the alkali metal compound which is preferably and almost invariably employed will be either the alkali metal hydroxide or the alkali metal fluoride. In some circumstances it may be found possible or desirable to use the alkali metal oxide. Use of alkali metal carbonate or bicarbonate is ordinarily not desirable because of the liberation of $CO_2$ which contaminates the hydrocarbon stream. As the alkali metal I prefer to employ the more common sodium and potassium although the use of lithium is not precluded. Potassium is preferred. The other alkali metals, cesium and rubidium, although operative, are prohibitively expensive and are not used. The term "alkali metal" as used herein, therefore, comprehends the true alkali metals found in group I of the periodic system, and does not include ammonium.

By the treatment of the present invention, the organic fluorides contained in the hydrocarbon are decomposed, forming in part hydrofluoric acid which reacts with the alkali metal hydroxide or fluoride, preferably potassium hydroxide or fluoride, to form the alkali metal acid fluoride, preferably potassium acid fluoride, before it reacts with the silica in the alumina. When the alumina impregnated with the alkali metal compound has become spent, passage of hydrocarbon materials is interrupted, and the contact mass is replaced. The spent contact mass is then preferably heated to a relatively high temperature to decompose the alkali metal acid fluoride to yield HF which is recovered and to regenerate the contact mass which is then reused, in a repetition of the process. The temperature to which the mass is heated in order to effect this regeneration is preferably above 650° F. This regeneration is preferably carried out in a stream or current of an inert carrier gas which serves to carry off the hydrogen fluoride as liberated, the resulting mixture of carrier gas and hydrogen fluoride being conveyed away to a suitable recovery point where the hydrogen fluoride is recovered by cooling and condensation, the carrier gas being non-condensible.

For use in accordance with the present invention, the alumina in the form of either bauxite or activated alumina may be impregnated with an aqueous solution of the alkali hydroxide or fluoride, dried, and placed in a closed treating chamber. The hydrocarbon material is then passed in either the liquid or the vapor phase, preferably the former, through the contact mass at a space velocity of 1 to 10 volumes of liquid per volume of contact mass per hour. The temperature maintained at the contact chamber is preferably between about 150 and 550° F., and the pressure, although not critical, is preferably between 15 and 500 p. s. i.

Following is a specific example of the practice of the present invention:

*Example*

A debutanizer overhead effluent from the alkylation of a $C_4$ hydrocarbon fraction with an olefin in the presence of HF as a catalyst is passed through a bed of calcined bauxite impregnated with 6% by weight of potassium hydroxide. The rate of flow of the hydrocarbon is 5 liquid volumes of hydrocarbon per volume of catalyst per volume of contact mass per hour. The temperature is maintained at about 180° F. The pressure is sufficient to maintain the hydrocarbon in the liquid phase. Substantially complete removal of the organic fluorine takes place, and the effluent hydrocarbon material is free from silicon tetrafluoride. When spent, the contact mass is heated in a stream of a butane at approximately 700 to 800° F. to drive off HF which is recovered by cooling and condensation and returned to the alkylation step. The resulting regenerated contact mass which comprises bauxite and potassium fluoride is then reused for removing additional organic fluorine.

While specific details of the preferred mode of operation have been given in the foregoing for purposes of illustration, it is to be understood that the invention is not limited thereby, but is to be taken as limited solely by the language of the appended claims.

1. A process for treating hydrocarbon containing organically combined fluorine to remove said fluorine therefrom which comprises subjecting said hydrocarbon containing a minor quantity of organically combined fluorine to the action of dehydrated adsorbent silica-containing alumina impregnated with an alkali metal fluoride at a reaction temperature of from 150 to 550° F. and for a period of time such that said alumina catalyzes decomposition of the organic fluorine compounds present in the hydrocarbon with consequent liberation of the fluorine as hydrogen fluoride and combination of hydrogen fluoride so liberated with said alkali metal fluoride to give the corresponding alkali metal acid fluoride, said period of time being such that the hydrocarbon effluent from said treatment is substantially free of organically combined fluorine.

2. A process for treating hydrocarbon containing organically combined fluorine to remove said fluorine therefrom which comprises subjecting said hydrocarbon containing a minor quantity of organically combined fluorine to the action of dehydrated silica-containing bauxite impregnated with an alkali metal fluoride at a reaction temperature of from 150 to 550° F. and for a period of time such that said bauxite catalyzes decomposition of the organic fluorine compounds present in the hydrocarbon with consequent liberation of the fluorine as hydrogen fluoride and combination of hydrogen fluoride so liberated with said alkali metal fluoride to give the corresponding alkali metal acid fluoride, said period of time being such that the hydrocarbon effluent from said treatment is substantially free of organically combined fluorine.

3. A process for treating hydrocarbon containing organically combined fluorine to remove said fluorine therefrom which comprises subjecting said hydrocarbon containing a minor quantity of organically combined fluorine to the action of dehydrated silica-containing adsorbent alumina impregnated with from 2 to 10 per cent by weight of alkali metal fluoride at a reaction temperature of from 150 to 550° F. and for a period of time such that said alumina catalyzes decomposition of the organic fluorine compounds present in the hydrocarbon with consequent liberation of the fluorine as hydrogen fluoride and combination of hydrogen fluoride so liberated with said alkali metal fluoride to give the corresponding alkali metal acid fluoride, said period of time being such that the hydrocarbon effluent from said treatment is substantially free of organically combined fluorine.

4. A process for treating hydrocarbon containing organically combined fluorine to remove said fluorine therefrom which comprises subjecting said hydrocarbon containing a minor quantity of organically combined fluorine to the action of dehydrated silica-containing adsorbent alumina impregnated with potassium fluoride at a reaction temperature of from 150 to 550° F. and for a period of time such that said alumina catalyzes decomposition of the organic fluorine compounds present in the hydrocarbon with consequent liberation of the fluorine as hydrogen fluoride and combination of hydrogen fluoride so liberated with said potassium fluoride to give potassium acid fluoride, said period of time being such that the hydrocarbon effluent from said treatment is substantially free of organically combined fluorine.

5. A process for treating hydrocarbon containing organically combined fluorine to remove said fluorine therefrom which comprises subjecting said hydrocarbon containing a minor quantity of organically combined fluorine to the action of dehydrated silica-containing bauxite impregnated with from 2 to 10 per cent by weight of potassium fluoride at a reaction temperature of from 150 to 550° F. and for a period of time such that said bauxite catalyzes decomposition of the organic fluorine compounds present in the hydrocarbon with consequent liberation of the fluorine as hydrogen fluoride and combination of hydrogen fluoride so liberated with said potassium fluoride to give potassium acid fluoride, said period of time being such that the hydrocarbon effluent from said treatment is substantially free of organically combined fluorine.

FREDERICK E. FREY.